UNITED STATES PATENT OFFICE.

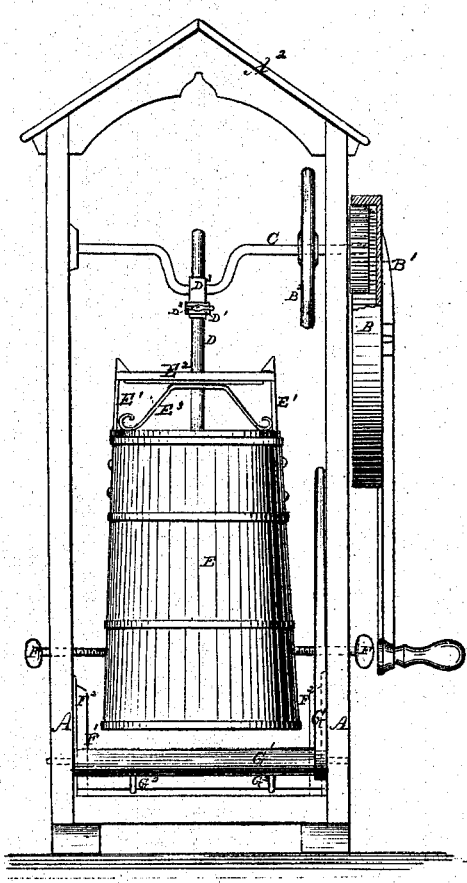
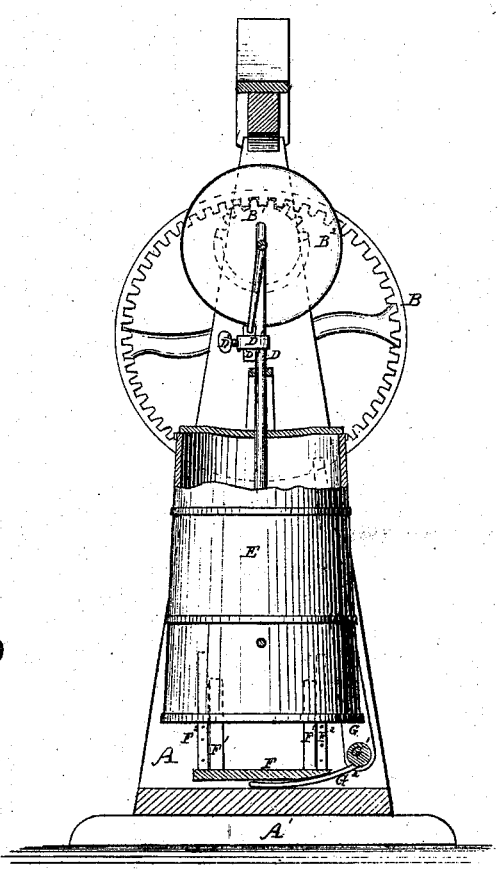

NIMROD E. WILSON, OF WILSONBURG, WEST VIRGINIA.

IMPROVEMENT IN OSCILLATING CHURNS.

Specification forming part of Letters Patent No. 105,533, dated July 19, 1870.

*To all whom it may concern:*

Be it known that I, N. E. WILSON, of Wilsonburg, in the county of Harrison and State of West Virginia, have invented certain Improvements in Oscillating Churns; and I do hereby declare that the following is a full, clear, and exact description thereof, reference being had to the annexed drawings, making part of this specification, in which—

Figure 1 is a side elevation of my improved oscillating churn, showing the mechanism for moving the dasher and the adjustable platform upon which the barrel stands, together with the devices for raising and lowering said platform, and for holding the barrel in its position. Fig. 2 is a side elevation, partly in section, also showing the parts above alluded to.

Corresponding letters denote corresponding parts in both figures.

The object sought to be accomplished by this invention is the production of a churn in which large and small quantities of milk or cream can be churned with equal facility; and to this end it consists in the combination and arrangement of devices for adjusting the barrel thereof, and for securing the dasher-rod to the crank, and for holding the lid down upon the barrel, as will be more fully described hereinafter.

A in the drawings refers to the frame of the device, which may be of any desired form and of any suitable material, the only requirement being that it shall be adapted to receive the parts it is designed to support, one form being shown in the drawings. The sides of the frame rest upon or are secured to the base $A^1$, and are secured at their upper ends by a cap, $A^2$.

B refers to an internal gear-wheel, which is to be fitted to revolve upon a stud which is secured to the frame A. To this wheel there is to be attached a crank for rotating it, as shown in Fig. 1 of the drawings.

$B^1$ refers to a pinion, which may be of any required size, to give any desired number of revolutions to the crank-axle to one of the driving-wheels. This crank is to be secured to the outer end of crank-shaft C, which protrudes through the frame A a sufficient distance for that purpose.

C refers to the crank above alluded to, it having its bearings in the sides A A of the frame, and being bent at its center, so as to form a crank of any desired length of throw, as shown in Fig. 1.

Upon this shaft there may be placed a fly or balance wheel, $B^2$, to give regularity to the movement thereof; or such wheel may be dispensed with, and the machine will work well without it.

D refers to a rod which is attached to the dasher, which is within the barrel E. This rod passes up through the cover of the barrel, and is secured to the crank of shaft C by means of a clamp, $D^1$, thumb-screw, $D^2$, and block $D^3$, the said block having an aperture through it for the passage of such crank.

It will be seen that, by loosening the thumb-screw, the dasher-rod may be adjusted within the block $D^3$, so as to cause the dasher to assume any desired position within the barrel, which is shown at E, and may be of any desired capacity, and is to have, rising from its top, a frame-work, to serve as a guide for the dasher-rod. This frame-work consists of two springs, $E^1$, and cross-bar $E^2$, the springs being provided with hooks upon their upper ends, which hook over the ends of the cross-bar and recede into notches therein.

Upon the under side of this cross-bar a springy piece of metal, $E^3$, curved as shown in Fig. 1, is secured, which, when the cross-bar is placed over the hooked springs, bears with its scrolled ends upon the lid of the churn, and holds it firmly in place, at the same time that it supports such cross-bar. This barrel is to be suspended upon screws $D^1 D^1$, which pass through the sides A A of the frame, and serve as pivots upon which said barrel oscillates, said barrel being provided with plates of metal upon its sides, which plates are to be provided with suitable recesses for the reception of the ends of the set-screws.

F refers to a platform, which, when in its lowest position, rests upon the base $A^1$ of the frame. This platform is provided with uprights $F^1 F^1$, which rise from its ends, and serve as guides when the platform is being raised and lowered, there being cleats $F^2 F^2$ attached to the inside of the frame A A, to direct its movements.

G refers to a lever, which is to be attached to a shaft, $G^1$, which has its bearings in the sides A A of the frame.

When the platform is in the position shown in Fig. 2, the lever G assumes a vertical position; but when it becomes necessary to raise the barrel, such lever is turned toward a horizontal position, which causes the shaft $G^1$ to be partially rotated, by which means the arms $G^2$ $G^2$ come in contact with the under side of the platform, which causes the same to be raised, and with it the barrel of the churn, the set-screws $D^3$ having been previously loosened.

As a consequence of the above-described arrangement of parts, the barrel and dasher may be adjusted so as to accommodate them to any quantity of material which it may be desirable to churn at any one time. Thus, if it becomes necessary to churn the barrel nearly full, it may be so placed that the dasher will be lifted out of such material, so as to give the full amount of agitation caused by its entering the same; and the same result may be accomplished when only a small quantity of material is to be operated upon, without causing the same to be forced out of the barrel by the violence of the contact of the dasher therewith.

Having thus described my invention, what I claim, and desire to secure by Letters Patent, is—

1. The combination of the crank-shaft C, dasher-rod D, block $D^3$, clamp $D^1$, and set-screw $D^2$, or their equivalents, their arrangement being such that the dasher-rod may be confined to the cranks at any desired point, substantially as and for the purpose specified.

2. The combination and arrangement of the barrel E, platform F, and lever G, its shaft $G^1$, and arms $G^2$, or their equivalents, substantially as and for the purpose specified.

3. The combination of the hooked springs $E^1$, cross-bar $E^2$, and curved spring $E^3$, substantially as and for the purpose set forth.

In testimony whereof I have signed my name to this specification in the presence of two subscribing witnesses.

NIMROD E. WILSON.

Witnesses:
JAMES M. PLANT,
ADAM GAIN.